United States Patent [19]

Seibold

[11] 4,055,890

[45] * Nov. 1, 1977

[54] GRASS TRIMMING DEVICE

[76] Inventor: Paul F. Seibold, 1760 N. Woodward, Bloomfield Hills, Mich. 48013

[*] Notice: The portion of the term of this patent subsequent to July 26, 1994, has been disclaimed.

[21] Appl. No.: 697,048

[22] Filed: June 17, 1976

[51] Int. Cl.² ............... B26B 15/00; A01D 55/18
[52] U.S. Cl. .................................. 30/240; 30/206; 30/DIG. 1
[58] Field of Search ............... 30/240, 276, DIG. 1, 30/205, 206; 56/16.9, 17.1, DIG. 18

[56] References Cited

U.S. PATENT DOCUMENTS

| | | | |
|---|---|---|---|
| 1,190,476 | 7/1916 | Smith | 30/205 X |
| 2,197,561 | 4/1940 | Orr | 30/276 X |
| 2,263,431 | 11/1941 | White | 30/276 X |
| 2,645,010 | 7/1953 | Holmes | 30/240 X |
| 2,648,187 | 8/1953 | Ries | 56/16.9 |

*Primary Examiner*—Jimmy C. Peters
*Attorney, Agent, or Firm*—Harness, Dickey & Pierce

[57] ABSTRACT

The trimming device has a blade driven by a shaft to have each end pass over cutting teeth at the edge of a circular cutting plate. The drive mechanism is a motor having an enclosed speed reducing unit for driving a shaft at a low speed when rotating the blade. The circular cutting plate is secured to the bottom of the motor housing through the center of which the driven shaft extends. A bail for a handle having a switch and a receptacle for the prongs of a plug on a cord is pivotally mounted on the housing to be positioned at a small angle to the circular cutting plate and 90° therefrom in a vertical position. An extension handle may be applied to the end of the short handle to have the device swing therefrom.

15 Claims, 4 Drawing Figures

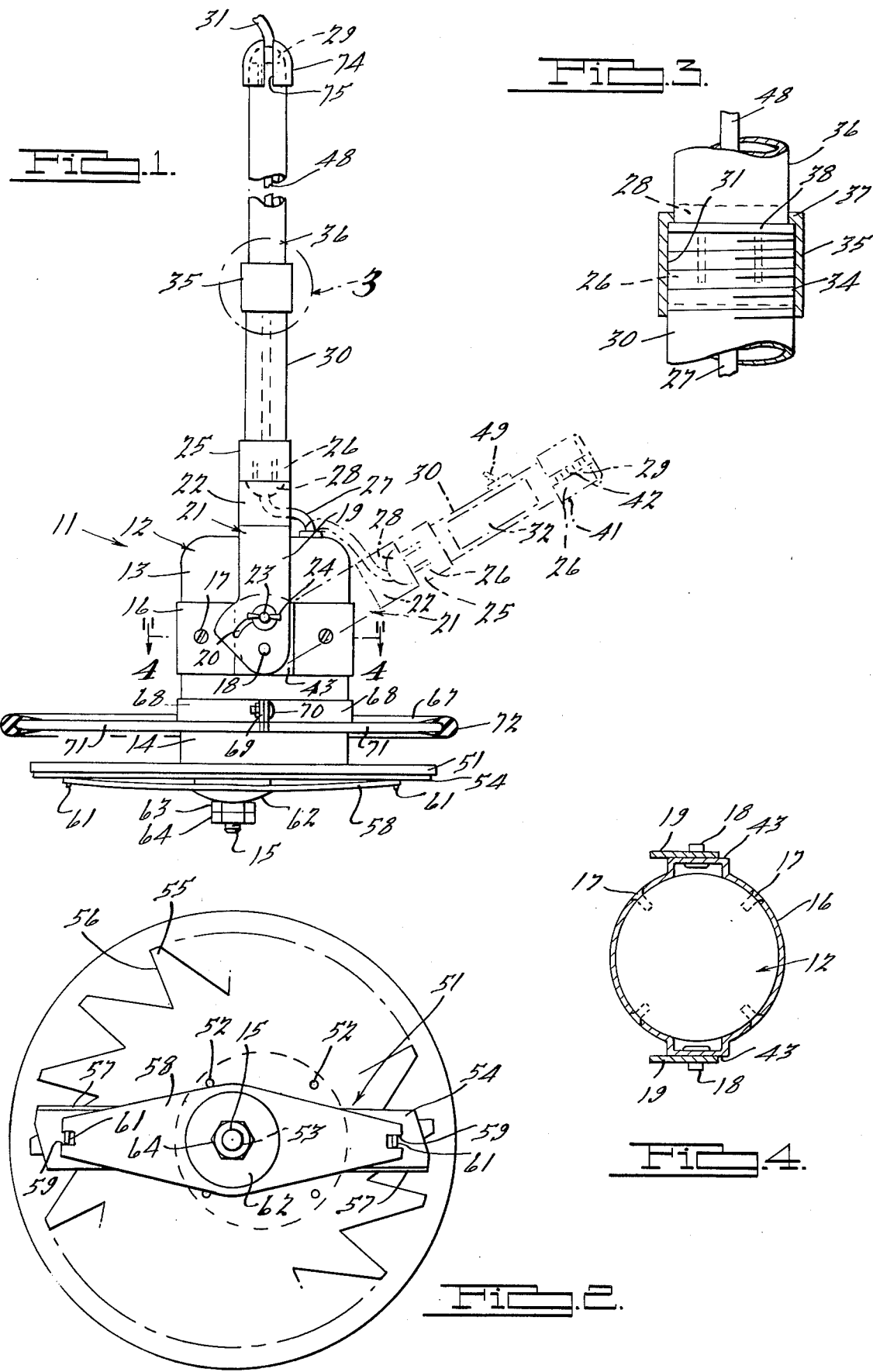

GRASS TRIMMING DEVICE

RELATED APPLICATION

Reference may be had to the inventor's application, Ser. No. 331,491, filed Feb. 2, 1973 for Grass Trimming Device.

BACKGROUND OF THE INVENTION

Grass trimming shears have been provided for many years which are hand or motor operated and more recently a reciprocal type of trimming device has been developed employing an oscillating movement for cutting the grass. A motor driven filament supported on a long handle and rotated at high speed is employed as a trimming device. The ordinary manually or electrically operated trimming device has questionable cutting ability and the cutting bar and cord supported by the motor are objectionable because of the high-speed operation.

SUMMARY OF THE INVENTION

The invention pertains to a grass trimming device which has a hardened circular cutter plate containing teeth at the edge. A cutting blade is held against the bottom of the plate and rotated to have opposite side edges pass across the teeth, the cutting edges of which are radially disposed to produce a scissor's cutting action. The motor drives an offset drive shaft at reduced speed, the shaft extending through a central aperture in the cutter plate which is supported on the bottom of the motor housing. The motor housing supports a bail having a handle containing a switch and a chargeable battery or a pair of conductors. The bail has a sleeve containing a receptacle for a pronged plug at both ends, the forward one being connected by a pronged plug to the motor. A handle has a pronged plug secured to the rearward receptacle and to the bail sleeve by a threaded sleeve on the handle. The handle has a receptacle at the opposite end which receives a plug of a conductor. The cutting blade has an arched pressure bar in engagement therewith and are freely swingable on the driven shaft. The pressure bar extends outwardly adjacent to the ends of the cutting bar and is interlocked therewith by interengaging fingers and apertures. A spring disk or Belleville washer is mounted on the driven shaft in engagement with the arched pressure bar to provide a friction drive therebetween. Nuts threaded on the end of the driven shaft are adjustable to regulate the amount of friction provided on the drive for the cutting blade.

BRIEF DESCRIPTION OF THE DRAWING

FIG. 1 is a broken view in elevation of a trimming device embodying features of the present invention;

FIG. 2 is a bottom view of the structure illustrated in FIG. 1;

FIG. 3 is an enlarged broken view of the structure illustrated in FIG. 1, taken within the circle 3 thereof, and FIG. 4 is a sectional view of the structure illustrated in FIG. 1, taken on the line 4—4 thereof.

DESCRIPTION OF THE PREFERRED EMBODIMENT

Referring to the drawing, a lawn trimming device 11 has a motor 12 within a housing 13 having an extending end 14 containing speed reduction gearing for operating a drive shaft 15 which is off-center from the center of the motor armature shaft. Where the housing 13 is cylindrical a circular band 16 is secured thereon by a plurality of screws 17. The band has diametrically disposed trunnions 18 to which the arms 19 of the forked end 21 of a bail 22 is secured for pivotal movement. Each end of the arms 19 has a slot 20 therein struck on a radius from the trunnions 18. Aligned studs 23 on the band 16 extend through the slots 20 with a wing nut 24 thereon. With this arrangement the bail 22 may be moved from a vertical position to an angular relation of about 15° to the bottom of the housing where it is secured by the wing nuts 24. The bail 22 has a central cylindrical sleeve 25 which receives a short handle 30 for directly applying the trimming device to the grass. Both ends of the handle 30 have a receptacle 26 therein, the one at the lower end is employed for receiving the prongs of a plug 28 on a conduit 27 from the motor 12. The receptacle 26 at the outer end of the handle 30 receives a plug 29 at the end of a conductor 31 within the handle which supplies current to the motor 12 or battery 32. The outer surface of the remote end of the handle 30 has a thread 34 thereon onto which an internally threaded sleeve 35 is secured. The sleeve 35 extends over a cylindrical tube 36 which forms an extension of the handle 30 with its flange 37 in engagement with a flange 38 on the end of the tube 36 which abuts the end of the handle 30.

When the tube 36 is not used, a cap 41 having a slot 42 in its side and to the center of the top may be used to protect the threads and secure a plug 29 to the end of the handle after the conductor 31 passes to the top center through the slot 42. The handles 30 and tube 36 have a plug at the bottom and a receptacle at the top which are joined together through a chargeable battery 32 within the tubular handle 30 or which may be joined together in both the handle and tube by a conduit 48. Preferably, a switch 49 is mounted on the handle 30 and connected to the battery or circuit. With this arrangement, the long tube can be used to swing the cutter plate and motor or the short handle 30 may be used to directly apply the cutter plate to the lawn. In FIG. 4, the band 16 is illustrated as having diametrically disposed flat portions 43 for supporting the trunnions 18 and the studs 23 and providing area contact with the end of the arms 19.

A hardened cutter plate 51 is secured to the end of the housing by a plurality of screws 52 which are preferably locked in position to prevent accidental loosening. The shaft 15 of the motor extends through a central aperture 53 in the plate 51 and through a cutting blade 54. The plate has teeth 55 provided in the edge thereof, the cutting edge 56 of which is disposed radially. The blade has a cutting edge 57 which are oppositely disposed on the ends extending from the shaft 15 which has scissors action with the cutting edges 56 so as to produce a clean cut to the grass when extending within the slots between the teeth 55. The blade 54 is made of flexible thin spring steel and is retained flat against the hardened surface of the plate 51 by a curved spring bar 58. The spring bar has its ends in engagement with the blade midway between the length of the teeth with a notch 59 thereat to receive a finger 61 which are struck from the blade 54. The fingers 61 in the notches 59 retain the blade 54 and spring bar 58 in alinged relation with each other since the spring bar is provided with an aperture that receives the driven shaft 15. A spring washer 62, such as a Belleville washer, on the shaft 15 is urged against the spring bar 58 by a nut 63 which, after adjustment, is locked in position by a second nut 64. The tension provided by the spring or Belleville washer 62 provides a force at the cutting edge which maintains the blade in good cutting position while at the same time forming a slip clutch which permits the blade to be stopped in its cutting operation when resistance is provided by a member extending into the slots between the teeth.

A circular guard 67 is provided for attachment to the motor when needed. The guard comes in two halves, each having a collar half 68 with flanges 69 which are secured together about the motor housing 13 by bolts 70. Semi-circular plates 71 are secured to the collar halves to extend outwardly thereof beyond the teeth 55 of the cutter plate 51. An elastomeric band 72 which is U-shape in cross section is secured to the edge of the plates 71 to cushion the edge of the guard.

As pointed out hereinabove, the cap 41 having a slot 42 extending through the side and top portion thereof is used to protect the thread on the end of the handle 30 and to secure the plug 29 of a conductor to the end of the handle, as illustrated in dot and dash line in FIG. 1. Further in the figure, it will be noted that a cap 74 having a slot 75 in the side and center is secured to the end of the extension tube 36 for retaining the prongs of the plug 29 within the receptacle at the end of the tube. The tube is made of thin steel and the cap 74 is magnetized to become a horseshoe type magnet which will secure itself in the position illustrated in the figure for holding the plug 29 in position. The magnetic cap can also be employed for securing a plug to a receptacle in a wall, on a machine or the like when the cover plate therefor is made of magnetizable metal. This will prevent the inadvertant separation of the prong of a plug on conductors to the conductors of the receptacle. It is to be understood that the closed end of the cup-like element may have a substantial part of the material removed to form an enlarged hole at the top center of the cap.

I claim:

1. In a grass trimming device, a shaft, a motor for driving said shaft, a circular plate having a central opening and radially disposed cutting teeth throughout the outer circumferential edge with a notch provided ahead of each tooth, said plate being disposed in fixed relation relative to said motor with said shaft extending through said opening, a cutting blade of narrow width having a length substantially equal to the diameter of said plate, said blade having a central aperture through which said shaft extends and secured in driving relation therewith with the cutting edges offset but in parallel relation with the centerline of the blade which is aligned with the center of the shaft, said blade cutting edges being in scissors relation with said radially disposed cutting edges, and a handle attached to said assembly and extending outwardly substantially normal to said plate to permit the motor and plate to be moved by said handle in any direction with no more than half of said teeth engaging the grass to be cut at any one time as one end of the cutting blade advances to cut the grass in a notch at one tooth only at any one time with a scissors cutting action to thereby substantially reduce the power required to operate the blade of the trimming device.

2. In a grass trimming device as recited in claim 1, wherein said handle has spaced extending legs at the bottom end for engaging the assembly of the motor and plate on opposite sides of the said shaft.

3. In a grass trimming device as recited in claim 2, wherin the legs are secured by pivot means, and means for additionally securing said legs to the assembly to prevent the handle from pivoting when the trimming device is in use.

4. In a grass trimming device as recited in claim 3, wherein said means for preventing the arms from pivoting when the device is in use permits the handle to be moved to an angular position relative to said shaft and secured in fixed position relative to said assembly.

5. In a trimming device as recited in claim 1, wherein a bail has its arms pivoted to the motor, said bail having a central cylindrical sleeve forming a handle, and conductively joined receptacles and plugs at both ends of the handle which conduct current to the motor.

6. In a trimming device as recited in claim 5, wherein the handle has an outside thread on the outer end thereof.

7. In a trimming device as recited in claim 6, wherein a handle extension is made from a tubular element with a flange at the bottom which abuts the end of the handle, and an internal threaded sleeve having an inwardly extending flange which is threaded on the thread of the cylindrical sleeve of the bail handle to clamp the tubular extension thereon with the flanges in secured engagement.

8. In a trimming device as recited in claim 7, wherein the end of the tube adjacent to the flange end has a plug therein with prongs extending outwardly therefrom in position to engage the conducting portion of the receptacle in the bail handle.

9. In a trimming device as recited in claim 8, wherein the outer end of the handle has a receptacle therein in which the prongs of a plug on a conductor may be inserted.

10. In a trimming device as recited in claim 9, wherein a conductor interconnects the receptacle and plug at the opposite end of the handle and tube.

11. In a trimming device as recited in claim 9, wherein a chargeable battery is mounted within the handle and connected to the receptacle and plug on the opposite end thereof.

12. In a trimming device as recited in claim 10, wherein a switch is mounted on the handle and connected to the conductor.

13. In a trimming device as recited in claim 6, wherein an internally threaded cap has a slot in the side and top to protect the handle, thread and securing a plug thereon.

14. In a trimming device as recited in claim 6, wherein an inverted cup shaped cap has a slot in the side wall extending to the center thereof for securing a plug of a conductor to the end of the handle.

15. In a trimming device as recited in claim 14, wherein the handle is made of magnetizable material and the metal of said cup is magnetized to become a horseshoe type of magnet to provide a holding force for securing the cap on the handle.

* * * * *